Patented Aug. 11, 1931

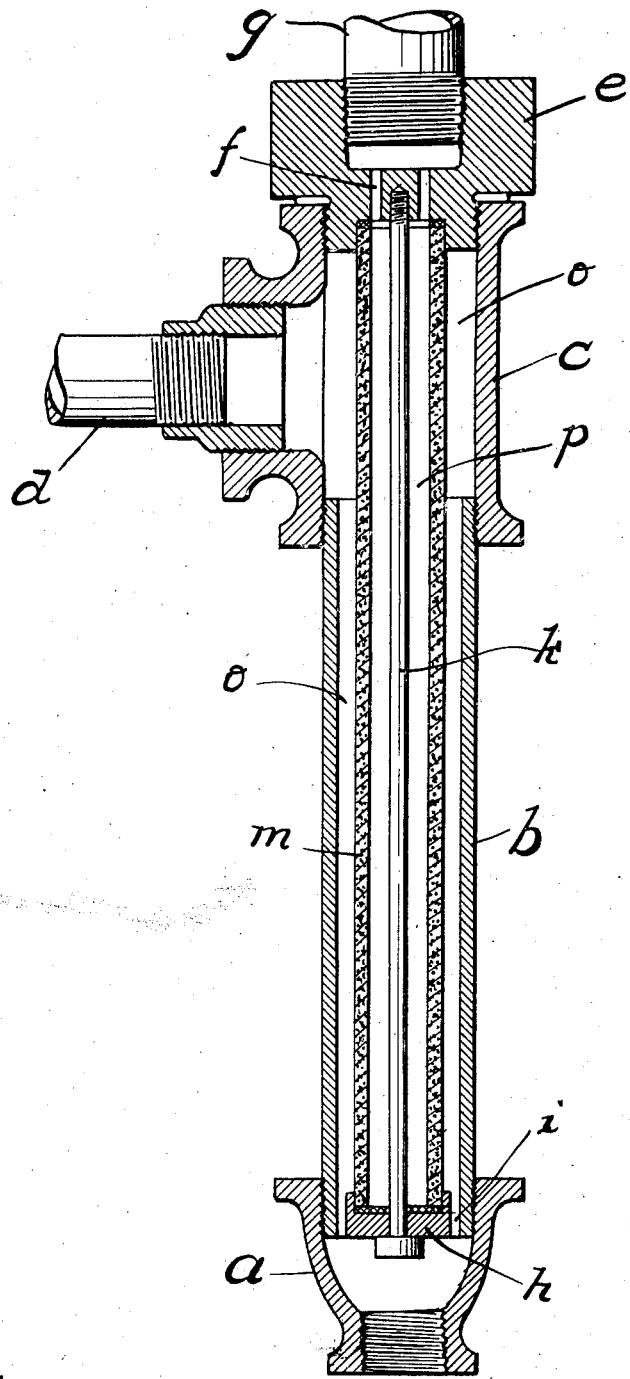

1,818,702

UNITED STATES PATENT OFFICE

ALAN E. FLOWERS, OF POUGHKEEPSIE, NEW YORK, ASSIGNOR TO THE DE LAVAL SEPARATOR COMPANY, OF NEW YORK, N. Y., A CORPORATION OF NEW JERSEY

PROCESS OF CAUSING A REACTION BETWEEN AN AQUEOUS REAGENT AND IMPURITIES IN OIL

Application filed June 9, 1927. Serial No. 197,744.

It is well understood that in order to promote thorough and quick reaction between oil and water or steam or an aqueous solution, it is desirable to get a large area of surface contact. As is well known, the reaction is one between the aqueous reagent and the impurities in the oil.

The large surface contact or intimate admixture required to produce the desired reaction is sometimes accomplished by vigorous agitation, which, however, often produces objectionable results, such as the formation of an emulsion that is difficult to break.

The injection is also sometimes accomplished by spraying through a nozzle or from a revolving disc, but this method of contact may produce the same, or other, objectionable conditions.

I have discovered that the desired reaction may be promoted without the use of complicated moving apparatus or objectionable consequences, such as the formation of a tight emulsion, if the intimate mixture is produced by causing one of said fluids, preferably the water, to pass through any suitable porous medium, such as clay walls, membranes, or textile bags, into contact with the other of said fluids, preferably the oil, one fluid being thereby introduced into the other fluid in a disseminated state, the degree of dissemination being permissibly greater than in the case of agitation or spraying but accompanied by no objectionable agitation. It is preferred to flow the fluid into two chambers (which, for example, may be conveniently made concentric) separated one from another by a porous medium, an outlet being provided for one fluid, but not for the other; the second fluid therefore penetrating the porous medium, disseminating itself therein, and entering into admixture with the first fluid over a wide area in a finely disseminated condition. Suitable pressure may be applied to increase the rate of the flow through the porous medium and the outflow of the first fluid may be suitably restricted.

One of many suitable apparatus is shown in the drawing, which is a sectional view of the apparatus.

Into a coupling $a$ is threaded the lower end of a tube $b$. Threaded on the upper end of a tube $b$ is a T $c$ having an inflow opening adapted to connect with an inflow pipe $d$. Threaded on the T $c$ is an end head $e$ provided with inflow orifices $f$ communicating with a recess in which is threaded an inflow pipe $g$. The lower end of tube $b$ is provided with an end head $h$ provided with outflow orifices $i$.

Confined between the end heads $e$ and $h$ is a tube $m$ of any porous material, such as alundum. A rod $k$ extends axially through the tube $m$ and is threaded into the end head $e$.

One fluid, say the oil, flows through pipe $d$ into the annular chamber $o$ surrounding tube $m$ and thence out the orifices $i$. The other fluid, say water, steam, or an aqueous solution, flows through inflow pipe $g$ and orifices $f$ into the central chamber $p$ within tube $m$. The central chamber has no outlet and all the water admitted thereto permeates tube $m$, is disseminated therein, and passes therefrom into contact with the oil over a substantial superficial area and in a disseminated state, but without producing objectionable agitation in the oil stream.

Where, in the claims, water is specified, it is intended to include, as an equivalent, steam, or any aqueous solution in the liquid or vapor stage.

Having now fully described my invention, what I claim and desire to protect by Letters Patent is:

1. The method of causing a reaction between an aqueous reagent and the impurities in oil which comprises flowing the aqueous reagent and the oil respectively into chambers on opposite sides of a porous medium, maintaining a circulation of one fluid into and out of its chamber along said porous medium in a stream that is narrow relative to the length and area of the surface of the stream in contact with said porous medium, substantially preventing outflow of the other fluid from its chamber except through said porous medium and applying pressure to such other fluid to maintain a high rate of flow thereof through said porous medium, the fluid under pressure thereby penetrating the fluid of the flowing stream over an extended area in a disseminated state but without producing substantial agitation.

2. The method of causing a reaction between an aqueous reagent and the impurities oil which comprises distributing the aqueous reagent in a finely disseminated condition adjacent the surface of a shallow and superficially extended body of oil and effecting penetration of said body of oil throughout said surface by the aqueous reagent in said disseminated state but without substantial agitation.

3. The method of causing a reaction between an aqueous reagent and the impurities in oil which comprises flowing the aqueous reagent and the oil respectively into chambers on opposite sides of a porous medium, maintaining a circulation of the oil into and out of its chamber along said porous medium in a stream that is narrow relative to the length and area of the surface of the stream in contact with said porous medium, substantially preventing outflow of the aqueous reagent from its chamber except through said porous medium and applying sufficient pressure to said aqueous medium to maintain a high rate of flow through said porous medium, the aqueous reagent thereby penetrating the oil of the flowing stream over an extended area of oil in a disseminated state but without producing substantial agitation.

In testimony of which invention, I have hereunto set my hand, at Poughkeepsie, N. Y., on this sixth day of June, 1927.

ALAN. E. FLOWERS.